United States Patent
Mitsuhashi (10) Patent No.: US 8,369,103 B2
(45) Date of Patent: Feb. 5, 2013

(54) FIXING STRUCTURE AND FIXING METHOD OF MULTI-SCREEN DISPLAY DEVICE

(75) Inventor: Renichi Mitsuhashi, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 69 days.

(21) Appl. No.: 12/998,757

(22) PCT Filed: Jan. 6, 2009

(86) PCT No.: PCT/JP2009/050044
§ 371 (c)(1),
(2), (4) Date: May 27, 2011

(87) PCT Pub. No.: WO2010/079588
PCT Pub. Date: Jul. 15, 2010

(65) Prior Publication Data
US 2011/0228504 A1    Sep. 22, 2011

(51) Int. Cl.
*H05K 7/20* (2006.01)
(52) U.S. Cl. ............. 361/807; 361/679.04; 361/679.21; 248/917; 248/918; 29/592.1
(58) Field of Classification Search .................... 361/807
See application file for complete search history.

(56) References Cited

U.S. PATENT DOCUMENTS

| 6,343,006 B1 * | 1/2002 | Moscovitch et al. .... 361/679.04 |
| 7,391,624 B2 * | 6/2008 | Hutter, III ..................... 361/810 |
| 7,997,550 B2 * | 8/2011 | Kuhn .......................... 248/276.1 |
| 8,042,698 B2 * | 10/2011 | Kim et al. ........................ 211/78 |
| 2003/0217495 A1 * | 11/2003 | Nagamine et al. .............. 40/605 |
| 2006/0238967 A1 * | 10/2006 | Carson et al. .................. 361/681 |
| 2008/0232044 A1 * | 9/2008 | Moscovitch .................. 361/681 |

FOREIGN PATENT DOCUMENTS

| JP | 7-321481 (A) | 12/1995 |
| JP | 10-177355 (A) | 6/1998 |
| JP | 10-198286 (A) | 7/1998 |
| JP | 2001-147646 (A) | 5/2001 |
| JP | 2001-290436 (A) | 10/2001 |
| JP | 2002-215053 (A) | 7/2002 |
| JP | 2003-15541 (A) | 1/2003 |
| JP | 2005-10661 (A) | 1/2005 |
| JP | 2007-184667 (A) | 7/2007 |

* cited by examiner

*Primary Examiner* — Anthony Q Edwards
(74) *Attorney, Agent, or Firm* — McGinn IP Law Group, PLLC (57) ABSTRACT

A multi-screen display device forms a large screen by adjacently arranging a plurality of display devices on a frame by engaging a monitor fixing provided on a back surface of a display device with a bracket that is provided on the frame; the monitor fitting that includes a plate-like body that is provided so as to project out from the back surface of the display device and a long hole that is formed in the plate-like body along with a lateral direction of the display device, is arranged at corner portions of the back surface of the display device; and the bracket includes a plate-like body that is perpendicularly provided at a position corresponding to the monitor fixing and a pin member that is provided in a standing manner in a vertical direction on the plate-like body, and is inserted in the long hole of the monitor fixing.

9 Claims, 12 Drawing Sheets

FIXING STRUCTURE AND FIXING METHOD OF MULTI-SCREEN DISPLAY DEVICE

TECHNICAL FIELD

The present invention relates to a multi-screen display device that forms a large screen by adjacently disposing a plurality of display devices, and is a technology relating to a fixing structure and a fixing method that can accurately position and fix this plurality of display devices.

BACKGROUND ART

Thin monitors include LCD devices and plasma display devices, with sizes up to the 50-inch class being mass produced. Moreover, in order to achieve large screen sizes exceeding 100 inches, a multi-screen display device is adopted that displays by arranging a plurality of these display devices. For example, if two 50-inch display devices are arranged vertically, and two 50-inch display devices are arranged horizontally, it is possible to constitute a 100-inch large-screen display device.

As a jig that fixes this type of display device, for example there is known a setting device for a display device that is shown in Patent Document 1.

This setting device that is shown in Patent Document 1 has a display portion mounting fitting that is fixed to the back surface of a display device, an engaging member that supports the display portion mounting fitting, and a suspending member that suspends the engaging member in a freely turning manner via a cylindrical metal fitting, and fixes and holds the display device to the suspending member by the display portion mounting fitting, the engaging member, and the cylindrical metal fitting.

[Patent Document 1] Japanese Unexamined Patent Application, First Publication No. 2001-147646

DISCLOSURE OF INVENTION

Problem to be Solved by the Invention

Since the setting device for a display device that is shown in Patent Document 1 directly fixes the display portion mounting fitting that is fixed to the back surface of a display device to the engaging member that is provided on a setting fitting with screws, there has been the problem of its adjustment being difficult, for example, when misalignment occurs between adjacent display devices.

Also, since the setting device of the aforementioned display device has a constitution that supports the display portion mounting fitting that is fixed to the center of the back surface of the display device with the engaging member that is provided on the setting fitting, position alignment of the display portion mounting fitting of the display device and the engaging member has been difficult, and this has been a cause of misalignment in the horizontal direction or vertical direction between adjacent display devices, as described above.

The present invention has been conceived in view of the abovementioned circumstances, and an object thereof is to provide a fixing structure and a fixing method of a multi-screen display device that can easily adjust misalignment of display devices when installing a plurality of display devices, and thereby can accurately position and fix the display devices without gaps appearing between adjacent display devices.

Means for Solving the Problem

In order to achieve the aforementioned object, in a fixing structure of a multi-screen display device according to the present invention, the multi-screen display device forms a large screen by adjacently arranging a plurality of display devices on a mounting seat by engaging a first support member provided on a back surface of a display device with a second support member that is provided on the mounting seat, the first support member includes a monitor fitting that includes a display-side support plate that is provided so as to project out from the back surface of the display device, and a long hole that is formed in the display-side support plate along with a lateral direction of the display device, the monitor fitting being arranged at corner portions of the back surface of the display device, the second support member includes a fixing-side support plate that is perpendicularly provided on the mounting seat at a position corresponding to the first support member, and a pin member that is provided in a standing manner in a vertical direction on the fixing-side support plate and is inserted in the long hole of the first support member, the monitor fitting of the first support member includes a pair of upper-side monitor fittings that are arranged at upper-side corner portions of the back surface of the display device, and a pair of lower-side monitor fittings that are arranged at lower-side corner portions of the back surface of the display device, the pin member of the second support member includes a base end portion having a large diameter and provided on the fixing-side support plate, and a support pin having a small diameter and provided in a standing manner in the vertical direction on the base end portion, a width dimension of a long hole of the upper-side monitor fitting is set so as to be engaged with the base end portion of the pin member, and a width dimension of a long hole of the lower-side monitor fitting is set so as to be engaged with the support pin of the pin member, and in a case of the first support member being engaged with the second support member, the long hole of the upper-side monitor fitting is engaged with the base end portion of the pin member, the display-side support plate of the upper-side monitor fitting is supported by the fixing-side support plate of the second support member, and the long hole of the lower-side monitor fitting is arranged at a midway portion along a length direction of the support pin of the pin member.

Also, in a fixing method of a multi-screen display device according to the present invention, the multi-screen display device forms a large screen by adjacently arranging a plurality of display devices on a mounting seat, and the fixing method includes arranging at corners of a back surface of a display device a monitor fitting that includes a display-side support plate that is provided so as to project out from the back surface of the display device and a long hole that is formed in the display-side support plate along with a lateral direction of the display device, and adjusting misalignment in the lateral direction of the display device by inserting a pin member that is provided on the mounting seat via a fixing-side support plate in a long hole of the monitor fitting provided on the back surface of the display device, and adjusting a position of the pin member with respect to the long hole along a lengthwise direction of the long hole.

Effect of the Invention

According to the present invention, by supporting the display-side support plate of the first support member with the fixing-side support plate of the second member, after inserting the pin member of the second support member that is provided on the mounting seat in the long hole of the first support member that is provided on the back surface of the display device, the entire display device is supported by the mounting seat. At this time, by inserting the pin member of the second support member that is provided on the mounting seat in the long hole of the first support member that is provided at the corner positions of the back surface of the display device, and adjusting the position of the pin member with respect to the long hole along the lengthwise direction of the long hole, it is possible to readily adjust misalignment in the lateral direction of the display device, and thereby when installing a plurality of display devices, it is possible to accurately position and fix the display devices without gaps appearing between adjacent display devices.

Also, in the present invention, the pin member of the second support member includes a large-diameter base end portion that is provided on the fixing-side support plate and a small-diameter support pin that is provided in a standing manner in the vertical direction on the base end portion, and in the case of the first support member being engaged with the second support member, the long hole of the upper-side monitor fitting is engaged with the base end portion of the pin member, and the display-side support plate of the upper-side monitor fitting is engaged with the fixing-side support plate of the second support member, and moreover the long hole of the lower-side monitor fitting is arranged at the midway portion along the lengthwise direction of the support pin of the pin member. With such a constitution, the support pin of the second support member that is inserted in the long hole of the upper-side monitor fitting enters an available state, and so it is possible to cause another display device to be engaged with the support pin. That is, by utilizing the support pin to position another display device on the upper side, and cause the long hole of the lower-side monitor fitting that constitutes the first support member of that display device to be positioned midway along the lengthwise direction of the support pin, it is possible to share the second support member between at least two display devices in the vertical direction, and it is possible to support a plurality of display devices with a small number of second support members.

BRIEF DESCRIPTION OF THE DRAWINGS

FIG. 3 is a perspective view that shows a frame that the display device of FIG. 1 is attached to.

Reference Symbols
1 Display device
1' Back surface
2 Monitor fitting (first support member)
2A Upper-side monitor fitting (first support member)
2B Lower-side monitor fitting (first support member)
4 Screw
5 Plate-like body (display-side support plate)
6 Long hole
10 Frame (mounting seat)
11 Bracket (second support member)
14 Plate-like body (fixing-side support plate)
15 Pin member
16 Base end portion
17 Support pin
17A Midway portion of support pin
30 Screw
31 Screw
40 L-shape bracket

BEST MODE FOR CARRYING OUT THE INVENTION

Hereinbelow, exemplary embodiments of the present invention shall be described with reference to the drawings. The exemplary embodiments described hereinbelow show one example among the exemplary embodiments of the present invention, and the present invention is not limited to these exemplary embodiments.

(First Exemplary Embodiment)

Figure 1:
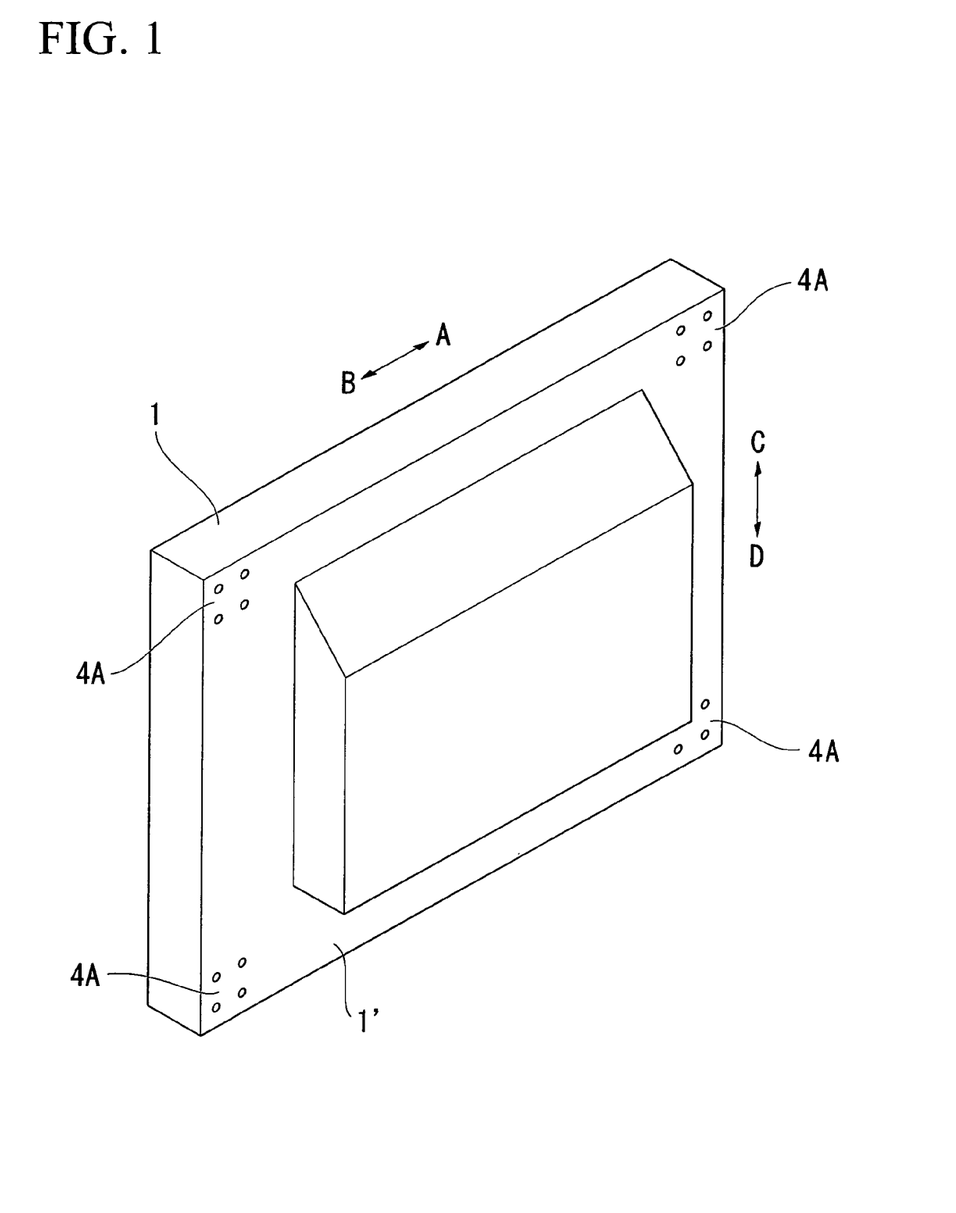
FIG. 1 is a perspective view seen from a rear side of a display device according to a first exemplary embodiment of the present invention.
Figure 2:
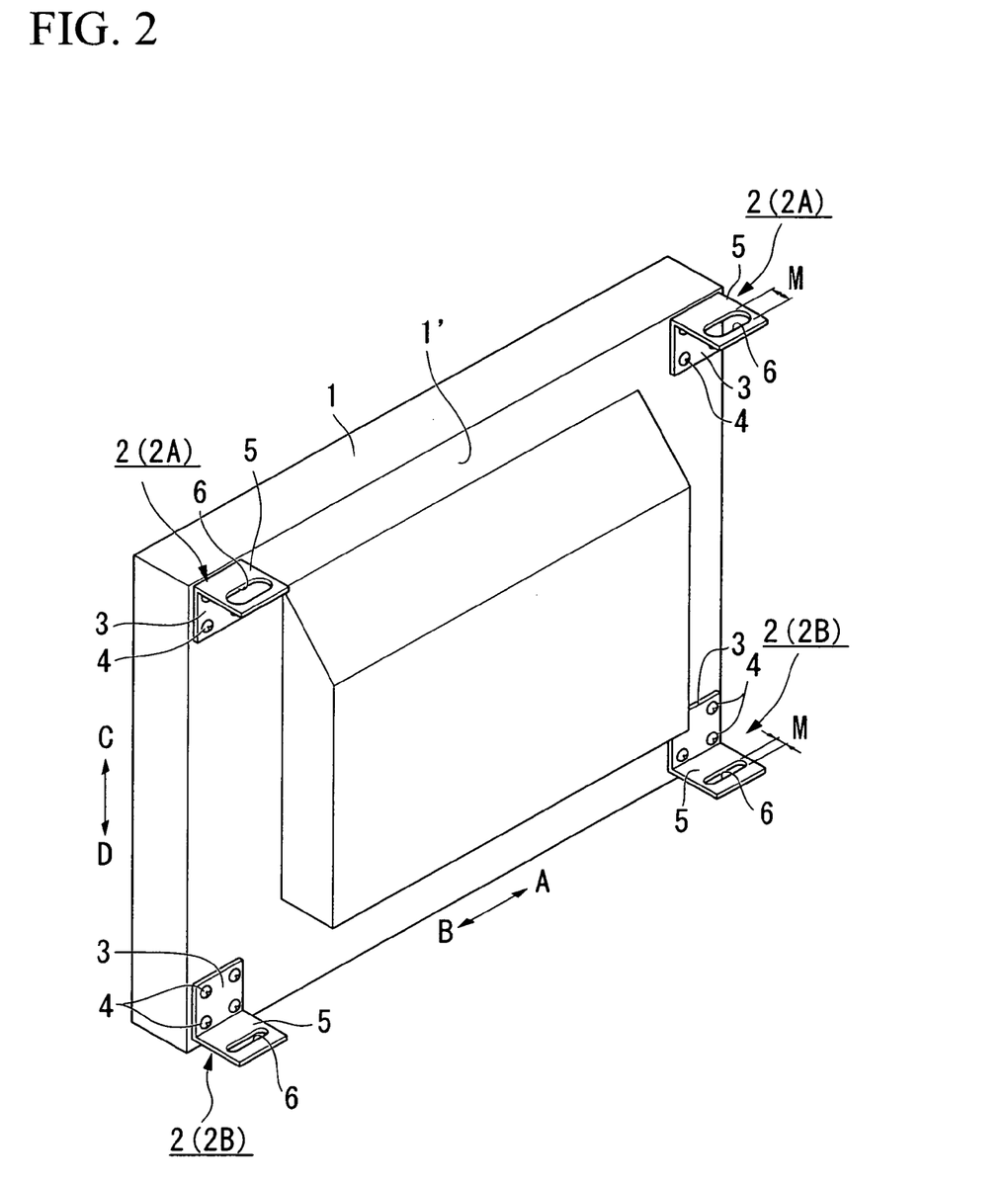
FIG. 2 is a perspective view that shows the state of monitor fittings attached to the display device of FIG. 1.

FIG. 1 to FIG. 7 are drawings that show a fixing structure and fixing method of a multi-screen display device according to a first exemplary embodiment of the present invention. As shown in FIG. 1 and FIG. 2, a monitor fitting 2 (first support member) is provided at the four corner portions at the back surface (denoted by reference symbol 1') of a display device 1.

This monitor fitting 2 is formed by an L-shape fitting, and a plate-like body 3 of one side that constitutes the L-shape fitting is fixed to attachment holes 4 on the back surface 1' of the display device 1 by screws 4, and a plate-like body 5 of the other side (display-side support plate) that constitutes the L-shape fitting is arranged so as to project out with respect to the back surface 1' of the display device 1 and be perpendicular to it. A long hole 6 is formed in this plate-like body 5 of the other side of the monitor fitting 2 so as to extend along the lateral direction of the display device 1 (direction of arrows A-B).

The width dimension (indicated by reference symbol M) of the long hole 6 of the monitor fittings 2 differs between the pair of monitor fittings 2 positioned on the upper side (hereinbelow referred to as the upper-side monitor fittings 2A) and the pair of monitor fittings 2 positioned on the lower side (hereinbelow referred to as the lower-side monitor fittings 2B).

The width dimension M (refer to FIG. 2) of the upper-side monitor fittings 2 (2A) is formed to be larger than the lower-side monitor fittings 2 (2B), and this is related to differences in the engagement locations with pin members 15 of a bracket 10. That is, the width dimension M of the long hole 6 of the upper-side monitor fittings 2 (2A) is set so as to be engaged with a base end portion 16 of the pin member 15. Also, the width dimension M of the long hole 6 of the lower-side monitor fittings 2 (2B) is set so as to be engaged with a support pin 17 of the pin member 15 (described below).

Figure 3:
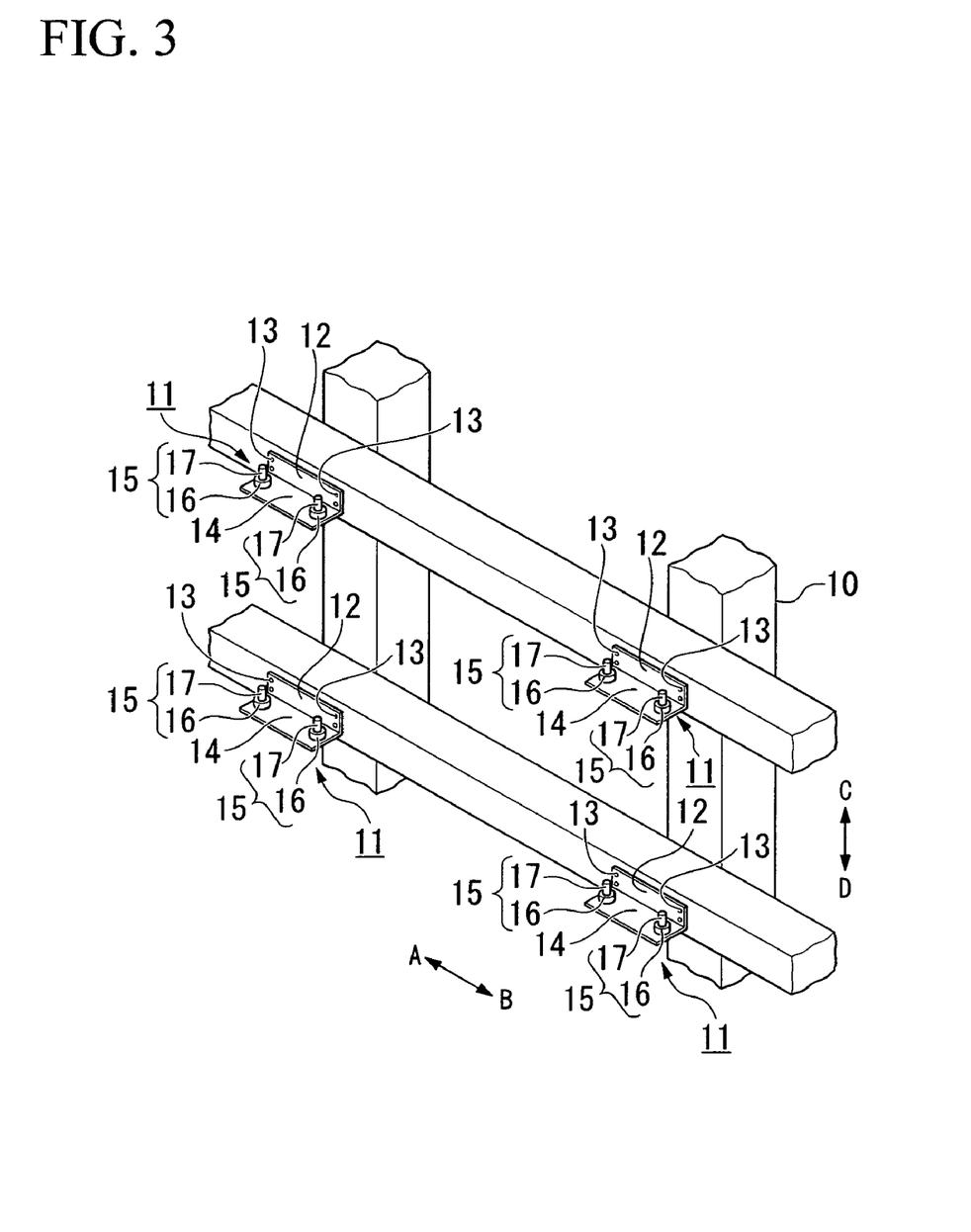

FIG. 3 shows a frame 10 (mounting seat) that the display device 1 is attached to, and a plurality of brackets 11 (second support members) that are coupled to the aforementioned monitor fittings 2 are fixed to the frame 10. The bracket 11 is formed by an L-shape fitting in the same manner as the monitor fitting 2, with a plate-like body 12 of one side that constitutes the L-shape fitting being fixed to the bracket 11 by screws 13, and a plate-like body 14 (fixing-side support plate) of the other side that constitutes the L-shape fitting being arranged so as to project from the bracket 11 and be perpendicular to it.

Also, each of the plurality of brackets 11 that are fixed to the frame 10 have a pair of pin members 15 that are provided with a gap on the plate-like body 14, and each pin member 15 is constituted from a base end portion 16 with a large diameter that is provided on the plate-like body 14 of the bracket 11, and a support pin 17 with a small diameter that is provided in a standing manner in the vertical direction (direction of arrows C-D) on the base end portion 16.

Figure 4:
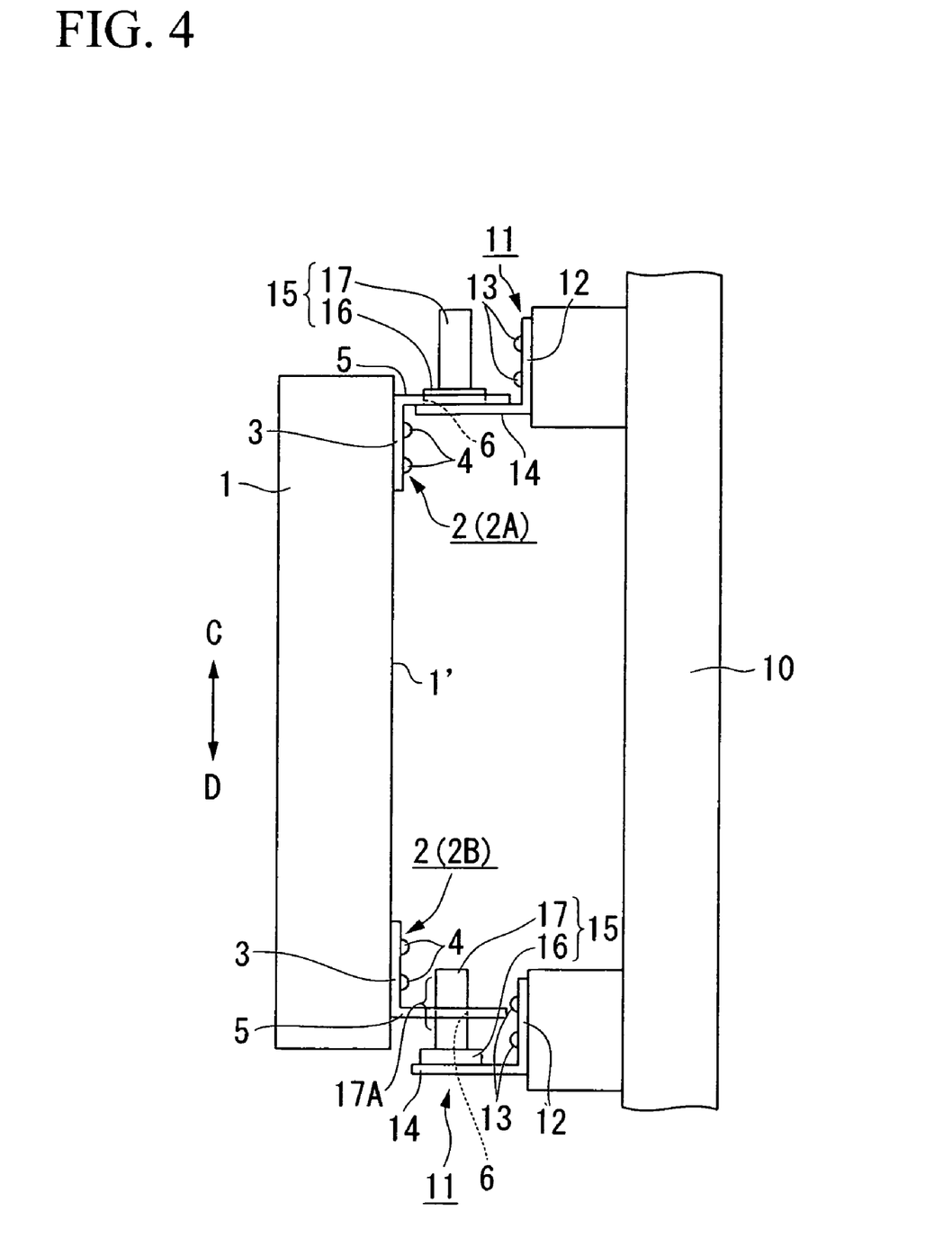
FIG. 4 is a side view that shows the state of the display device of FIG. 1 attached to the frame.

As shown in FIG. 4, the diameter of the base end portion 16 of the pin member 15 is set so as to be engaged with the long hole 6 of the upper-side monitor fitting 2 (2A), and the diameter of the support pin 17 of the pin member 15 is set so as to be engaged with the long hole 6 of the lower-side monitor fitting 2 (2B). Also, in the case of the pin member 15 of the bracket 11 being inserted in the long hole 6 of the upper-side and lower-side monitor fittings 2, the positional relation in the vertical direction (direction of arrows C-D) of the monitor fittings 2 and the brackets 11 is set so that the plate-like body 5 of the upper-side monitor fitting 2 (2A) is supported by the plate-like body 14 of the bracket 11 that is fixed to the frame 10, as shown in FIG. 4.

As a result of such dimensional settings, in the case of the monitor fitting 2 being made to engage with the bracket 11, as shown in FIG. 4, in the state of the long hole 6 of the upper-side monitor fitting 2 (2A) being engaged with the base end portion 16 of the pin member 15, the plate-like body 5 of the upper-side monitor fitting 2 (2A) is supported by the plate-like body 14 of the bracket 11, and the long hole 6 of the lower-side monitor fitting 2 (2B) is arranged at the midway portion along the lengthwise direction of the support pin 17 (shown by reference symbol 17A in FIG. 4).

Figure 5:
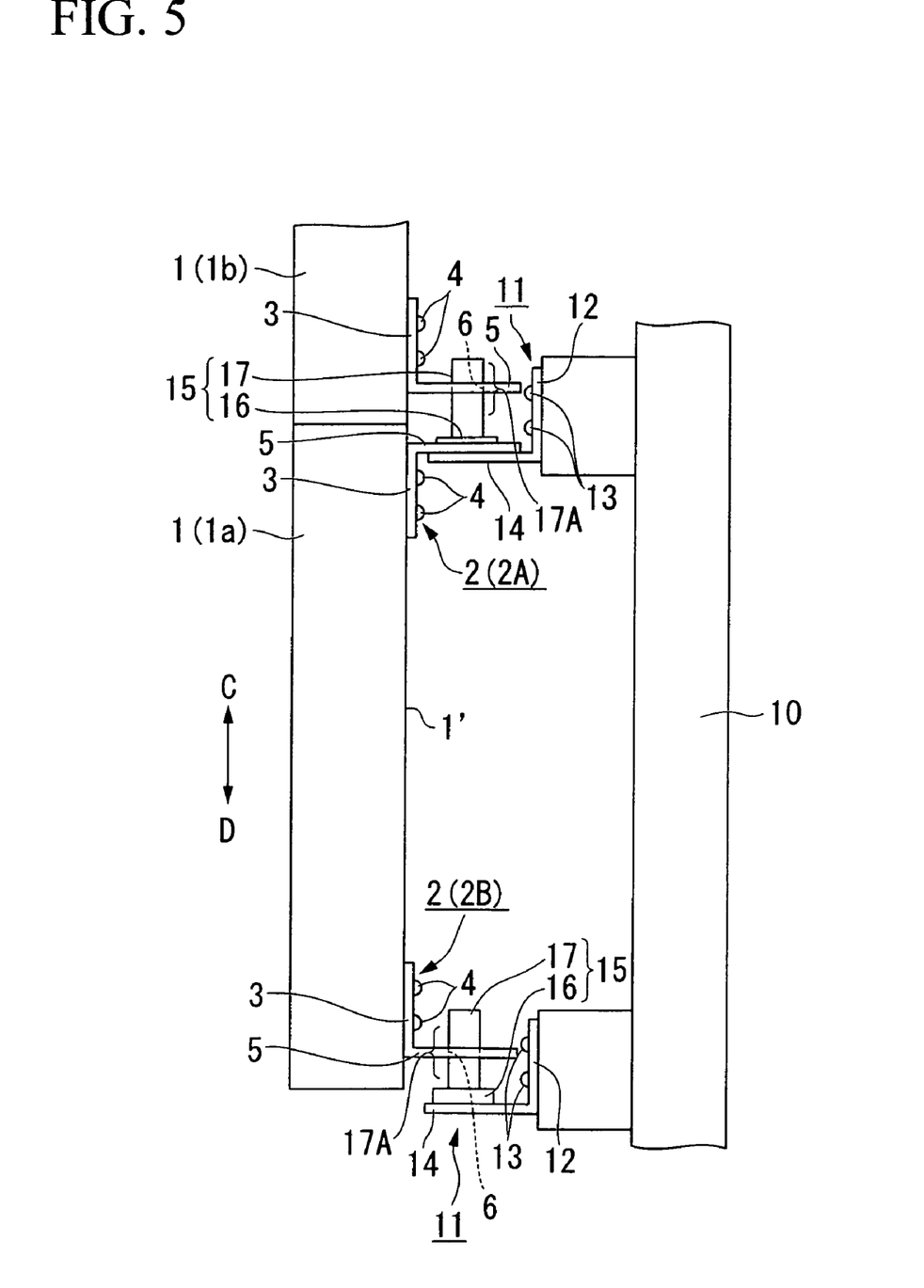
FIG. 5 is a plan view that shows the state of the display devices shown in FIG. 1 attached in multiple stages in the vertical direction.

The upper portion of the support pin 17 of the bracket 11 that is inserted in the long hole 6 of the upper-side monitor fitting 2 (2A) enters an available state due to the arrangement of the monitor fitting 2 to the bracket 11, and so it is possible to have another display device 1 be engaged on the support pin 17. That is, by utilizing the support pin 17 as shown in FIG. 5 to position another display device 1 (indicated by the reference symbol 1b in FIG. 5) on the upper side of the display device 1 that was initially installed (indicated by the reference symbol 1a in FIG. 5), and position the long hole 6 of the lower-side monitor fitting 2 (2B) that constitutes the monitor fitting 2 of that display device 1 (1b) at the midway portion 17A along the lengthwise direction of the support pin 17, it is possible to share the bracket 11 between at least two display devices 1 (1a and 1b) in the vertical direction.

Figure 6:
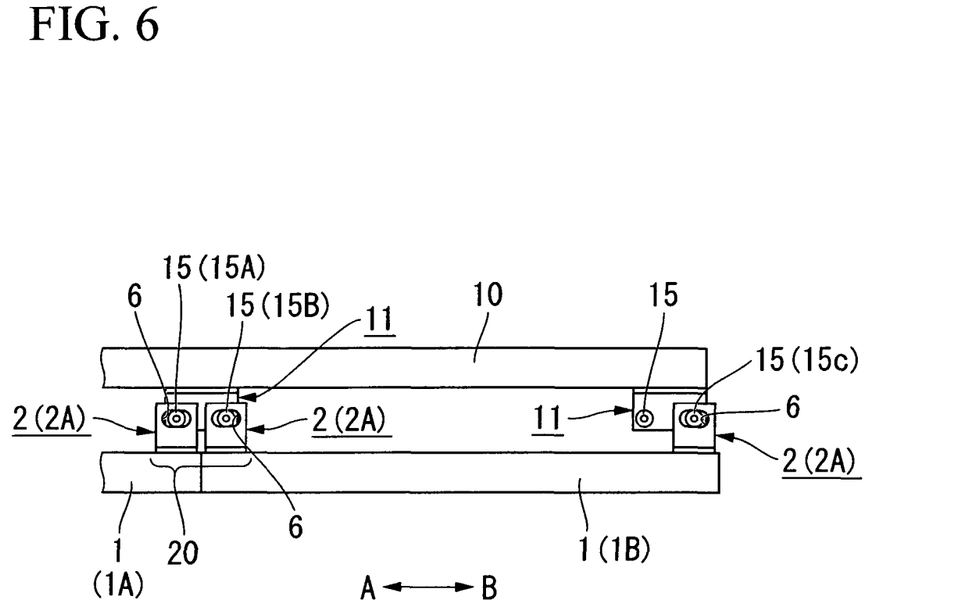
FIG. 6 is a plan view that shows the state of the display devices shown in FIG. 1 attached in multiple stages in the horizontal direction.

On the other hand, the pin members 15 of each bracket 11 are positioned on the plate-like body 14 of the bracket 11 corresponding to the interval of the long holes 6 of the pair of monitor fittings 2 that are installed in the lateral direction (direction of the arrows A-B) in the display device 1. Specifically, in the case of at least two display devices 1 being adjacently arranged in the lateral direction (direction of arrows A-B) as shown in FIG. 6, one pin member 15 (shown by reference symbol 15A) can be inserted in the long hole 6 of the monitor fitting 2 that is provided on the display device 1 of the one side (shown by reference symbol 1A), and the other pin member 15 (shown by reference symbol 15B) can be inserted in the long hole 6 of the monitor fitting 2 that is provided on the display device 1 of the other side (shown by reference symbol 1B). Thereby, at least two display devices 1 are arranged in a manner coupled in the lateral direction (direction of the arrows A-B).

Note that the arrangement as shown in FIG. 6 is performed when causing the monitor fittings 2 that are positioned at the adjoining location (reference symbol 20) of the two display devices 1 (1A and 1B) to be engaged to one bracket 11, and for the monitor fitting 2 on the opposite side of the adjoining location 20, the long hole 6 thereof is inserted on the pin member 15 positioned on the end portion side (on the side of the arrow B in FIG. 6) of the corresponding bracket 11 (indicated by reference symbol 15C). By the arrangement of the monitor fitting 2 to the bracket 11 in this way, the aesthetics of the display device 1 are retained when viewed from the front without the bracket 11 protruding from the display device 1.

FIG. 6 is an example of the case of adjacently arranging two display devices 1 (1A and 1B), but is not particularly limited to that number. In the case of making the number of display devices that are adjacently arranged three or more, the positional relationship of the two monitor fittings 2 positioned at the adjoining location and the bracket 11 that corresponds to them is the same as the two monitor fittings 2 and the bracket 11 (pin member 15A and pin member 15B) corresponding to them shown in FIG. 6. At this time, the number of brackets 11 to be used in the case of arranging the display devices 1 laterally in a row along the direction of the arrow A-B becomes "number of display devices 1×2+2".

In the multi-screen display device that is shown in the present exemplary embodiment as described in detail above, after inserting the pin members 15 of the bracket 11 provided on the frame 10 in the long holes 6 of the monitor fittings 2 provided on the back surface 1' of a display device 1, by supporting the plate-like bodies 5 of the monitor fittings 2 with the plate-like bodies 14 of the brackets 11, the entire display device 1 is supported by the frame 10. At this time, by inserting the pin members 15 of the brackets 11 that are provided on the frame 10 in the long holes 6 of the monitor fittings 2 provided on the back surface 1' of a display device 1, and adjusting the position of the pin member 15 with respect to the long hole 6 along the lengthwise direction of the long hole 6, it is possible to readily adjust misalignment of the display device 1 in the lateral direction (direction of the arrows A-B), and thereby when installing a plurality of the display devices 1, it becomes possible to accurately position and fix the display devices 1 without producing gaps between adjacent display devices 1.

Also, in the multi-screen display device of the present exemplary embodiment, the pin member 15 of the bracket 11 is constituted from the base end portion 16 with a large diameter that is provided on the plate-like body 14 of the bracket 11, and the support pin 17 with a small diameter that is provided on the base end portion 16 in an erect manner in the vertical direction (direction of arrows C-D), and in the case of engaging the monitor fittings 2 on the bracket 11, the long hole 6 of the upper-side monitor fitting 2 (2A) is engaged with the base end portion 16 of the pin member 15, and the plate-like body 5 of the upper-side monitor fitting 2 (2A) is supported by the plate-like body 14 of the bracket 11, and moreover the long hole 6 of the lower-side monitor fitting 2 (2B) is arranged at the midway portion 17A along the lengthwise direction of the support pin 17 of the pin member 15. Then, with such a constitution, the upper portion of the support pin 17 of the bracket 11 that has been inserted in the long hole 6 of the upper-side monitor fitting 2 (2A) enters an available state, and it is possible to cause another display device 1 to be engaged on the support pin 17. That is, by utilizing the support pin 17, if another display device 1 (1b) is made to be positioned on the upper side of the display device 1 (1a) that was initially installed (refer to FIG. 5), it is possible to share the bracket 11 between at least two display devices 1 in the vertical direction, and so it becomes possible to support a plurality of display devices 1 with a small number of brackets 11.

Also, in the multi-screen display device of the present exemplary embodiment, in the case of adjacently arranging at least two display devices (1A and 1B) in the lateral direction (direction of the arrows A-B) (refer to FIG. 6), the pin member 15 on one side of the bracket 11 is inserted in the long hole 6 of the monitor fitting 2 that is provided in the display device 1 (1A) of the one side, and the pin member 15 on the other side of the bracket 11 is inserted in the long hole 6 of the monitor fitting 2 that is provided in the display device 1 (1B) of the other side. Thereby, for at least two display devices (1A and 1B) that are arranged mutually adjacent, it is possible to support the adjacent monitor fitting 2 of each display device 1 with either of a pair of pin members 15 that are provided on the plate-like body 14 of the same bracket 11, and thereby it is possible to share that bracket 11 between at least two display devices 1 that are side by side, and so it is possible to support a plurality of display devices 1 with a small number of brackets 11.

Figure 7:
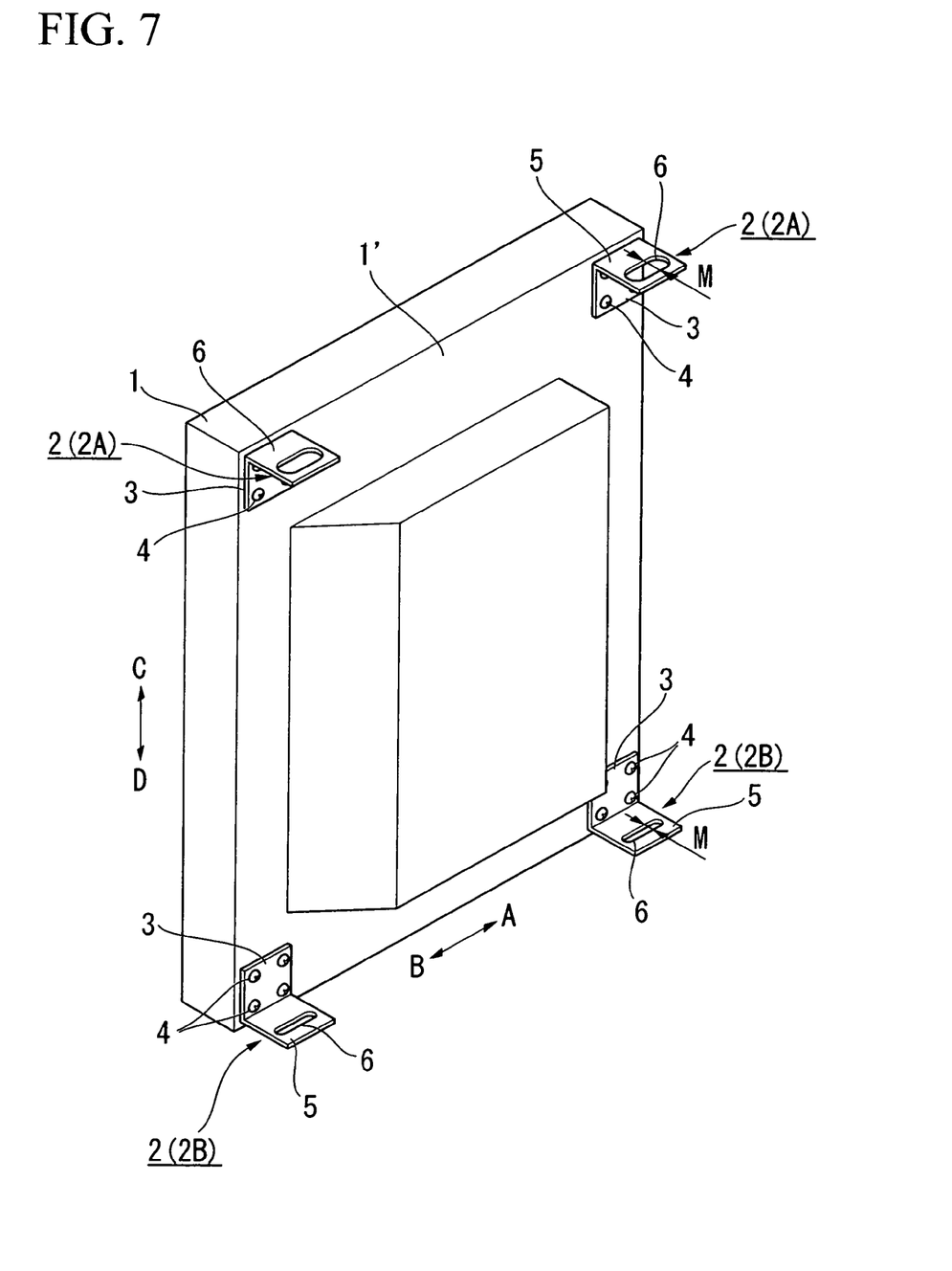
FIG. 7 is a perspective view that shows the state of the monitor fittings being attached in order to put the display device of FIG. 1 in a vertical orientation.

Note that in the present exemplary embodiment, the monitor fittings 2 were fixed to the back surface 1' of a display device 1 so that the display device 1 has a horizontal orientation, but is not limited thereto, and as shown in FIG. 7 the monitor fittings 2 may be fixed to the back surface 1' of a display device 1 so that the display device 1 has a vertical orientation. Also, FIG. 5 shows an example of a plurality of display devices 1 being adjacently arranged in the vertical direction (direction of arrows C-D), and FIG. 6 shows an example of a plurality of display devices 1 being adjacently arranged in the horizontal direction (direction of arrows A-B), but it is of course possible to arrange a plurality of display devices 1 in a matrix shape that is a combination of these. In this case, the number of required brackets 11 in the case of constituting display devices 1 in horizontal L columns and vertical R rows is defined as "(L+1)×(R+1)".

Figure 8:
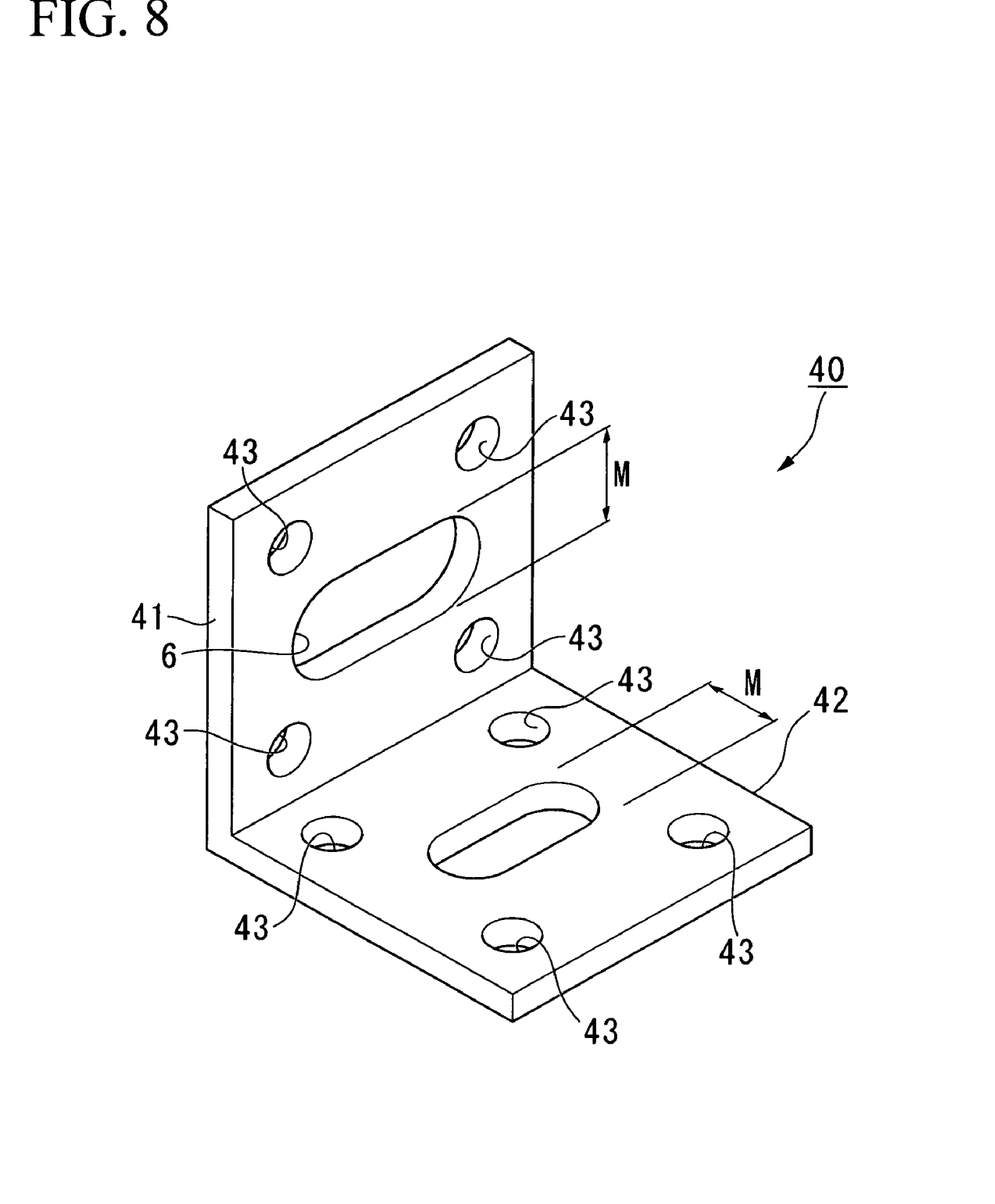
FIG. 8 is a perspective view that shows an L-shape bracket that is used as a monitor fitting according to another exemplary embodiment of the present invention.

Also, an L-shape fitting 40 shown in FIG. 8 may be used as the aforementioned monitor fitting 2. In this L-shape fitting 40, a large-diameter long hole 6 with a width dimension M that is set so as to be engaged with the base end portion 16 of the pin member 15 is formed in the plate-like body 41 of one side, and a small-diameter long hole 6 with a width dimension M that is set so as to be engaged with the support pin 17 of the pin member 15 is formed in the plate-like body 42 of the other side. Note that reference symbol 43 in FIG. 8 denotes a screw hole in which the screw 4 for fixing the L-shape fitting 40 to the back surface 1' of the display device 1 is inserted.

Figure 9:
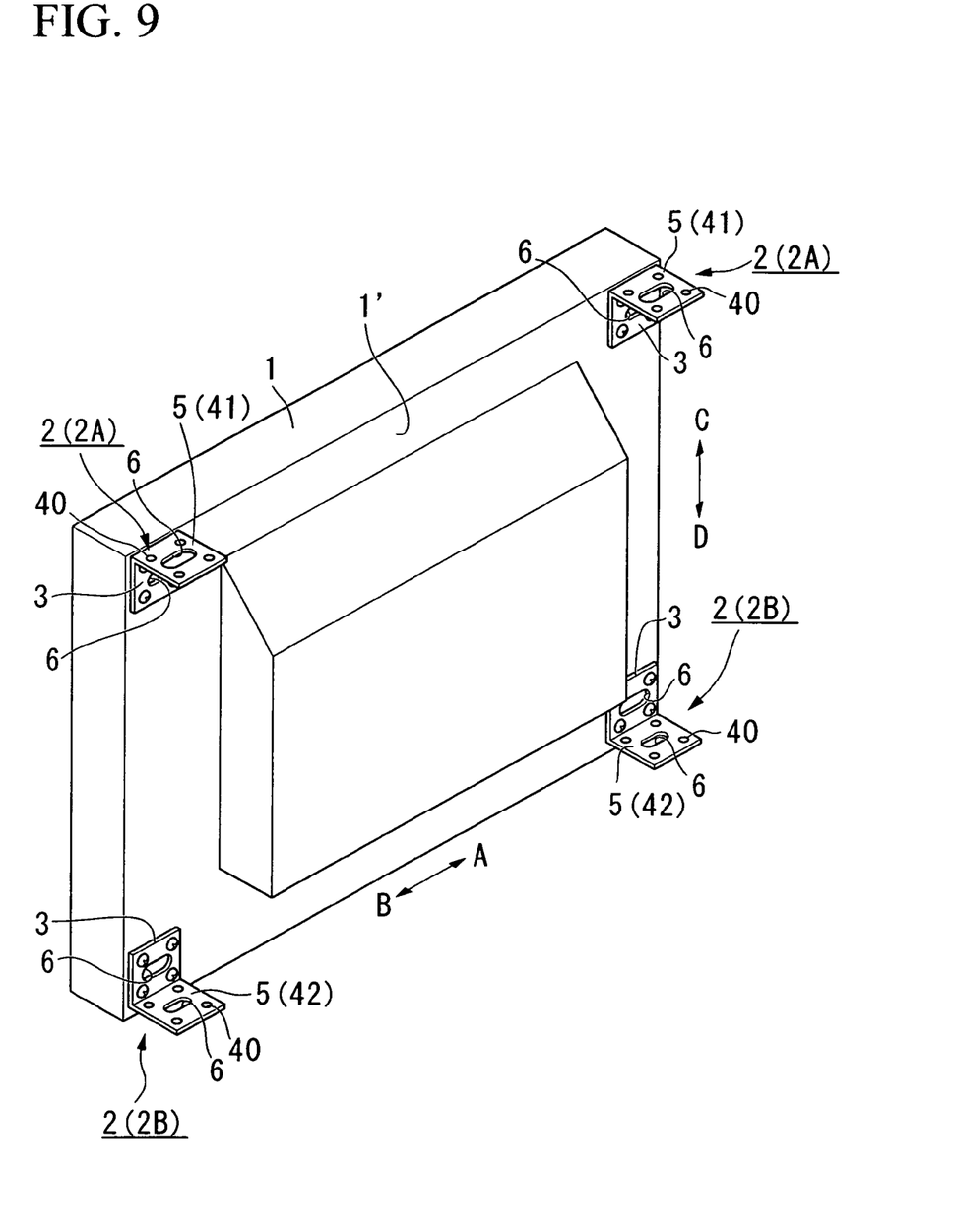
FIG. 9 is a perspective view that shows the state of the L-shape bracket of FIG. 8 attached to a display device.

In this kind of L-shape fitting 40, by fixing the plate-like body 42 that has the small-diameter long hole 6 to the back surface 1' of the display device 1, and causing the plate-like body 41 that has the large-diameter long hole 6 to project out from the back surface 1' of the display device 1 as shown in FIG. 9, it is possible to constitute the upper-side monitor fitting 2 (2A). In this case, the plate-like body 41 of the L-shape fitting 40 serves as the plate-like body 5 of the upper-side monitor fitting 2A.

Also, by changing the mounting direction, that is, fixing the plate-like body 41 that has the large-diameter long hole 6 to the back surface 1' of a display device 1, and causing the plate-like body 42 that has the small-diameter long hole 6 to project out from the back surface 1' of a display device 1, it is possible to constitute the lower-side monitor fitting 2 (2B). In this case, the plate-like body 42 of the L-shape fitting 40 serves as the plate-like body 5 of the lower-side monitor fitting 2 (2B).

In the multi-screen display device that is shown in FIG. 9, the monitor fitting 2 can be constituted by the L-shape fitting 40, and moreover, it is possible to have the plate-like body 41 of one side of the L-shape fitting serve as the plate-like body 5 of the upper-side monitor fitting 2 (2A) that has the large-diameter long hole 6, and have the plate-like body 42 of the other side of the L-shape fitting serve as the plate-like body 5 of the lower-side monitor fitting 2 (2B) that has the small-diameter long hole 6. Thereby, it is possible to use the L-shape fitting 40 as the upper-side monitor fitting 2 (2A) or as the lower-side monitor fitting 2 (2B) in accordance with the direction of mounting the L-shape fitting 40 to the back surface 1' of the display device 1, and as a result, it is possible to achieve commonality of parts, and reduce the overall manufacturing cost.

(Second Exemplary Embodiment)

Figure 10:
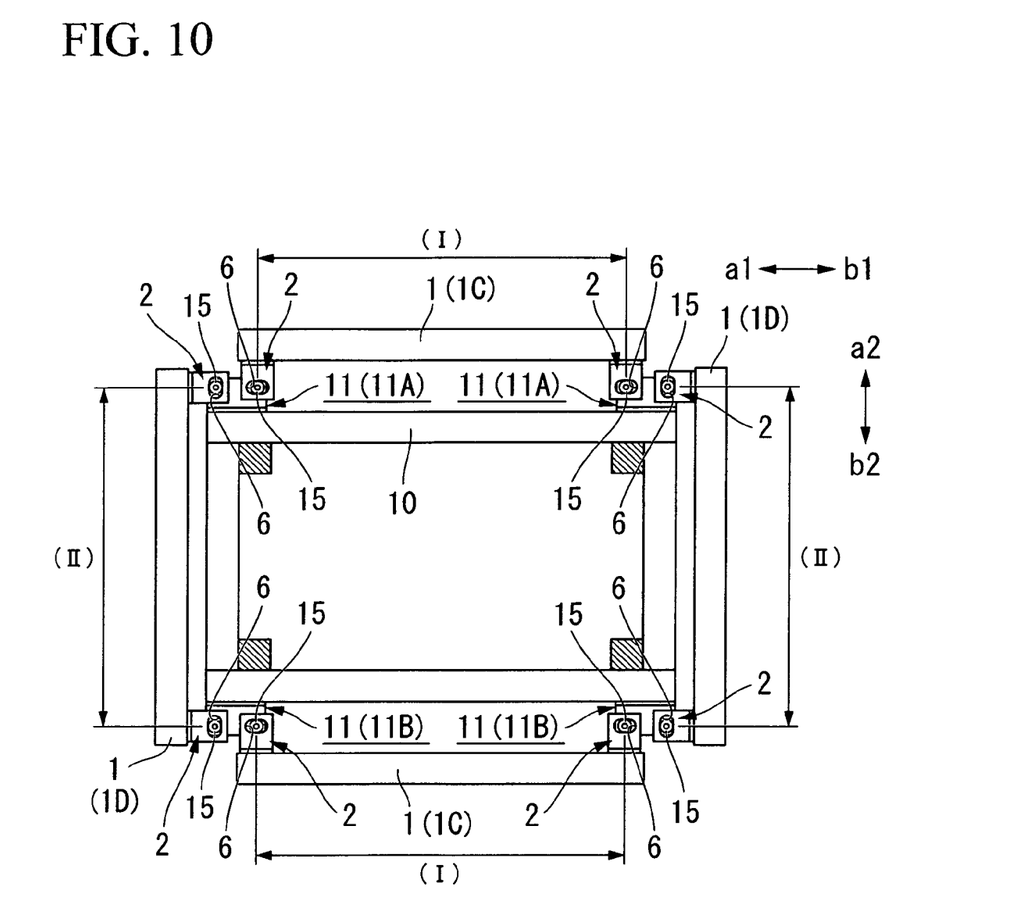
FIG. 10 is a plan view that shows the state of a plurality of display devices being coupled so as to form a square in plan view, according to a second exemplary embodiment of the present invention.

FIG. 10 is a top view of a multi-screen display device according to a second exemplary embodiment of the present invention. The multi-screen display device according to the second exemplary embodiment differs from the first exemplary embodiment in terms of the plurality of display devices 1 (1C and 1D) having an arrangement that forms a square shape in a planar view when viewed from above.

Specifically, the bracket 11 on which the long hole 6 of the monitor fitting 2 is inserted is constituted by providing a pair of pin members 15 on the plate-like body 14, and in the present exemplary embodiment two sets of a vertical pair of the brackets 11 (the brackets denoted by reference symbols 11A and 11A) are disposed on the frame 10 corresponding to the installation interval of the monitor fittings 2 on the display device 1, and moreover a similar two sets of brackets 11 (the brackets denoted by reference symbols 11B and 11B) are additionally disposed on the frame 10 corresponding to the installation interval of the monitor fittings 2 on the display device 1 so as to be parallel to the foregoing brackets 11A and 11A. Note that in this case, with a vertical pair of the brackets 11 serving as one set as shown in FIG. 4 and FIG. 5 of the foregoing exemplary embodiment, accordingly a total of four of the brackets 11 are used in two sets.

In such a bracket 11, the installation interval (denoted by reference symbol (I)) of the pin members 15 that are positioned on the inner side of the brackets 11A and 11A and the pin members 15 that are positioned on the inner side of the brackets 11B and 11B is set in the horizontal direction (the direction of the arrows a1-b1) corresponding to the installation interval of the long holes 6 of the monitor fittings 2 that support the display devices 1 (shown by reference symbol 1C), and the installation interval (denoted by reference symbol (II)) of the pin members 15 positioned on the outer side of the brackets 11A and 11A and the pin members 15 positioned on the outer side of the brackets 11B and 11B is set corresponding to the installation interval of the long holes 6 of the monitor fittings 2 that support the display devices 1 (shown by reference symbol 1D) along the horizontal direction (the direction of the arrows a2-b2) that is perpendicular to the previous direction of the arrows a1-b1.

That is, the four sets of brackets 11A, 11A, 11B, 11B (using a total of eight brackets) are arranged so that the four display devices 1 (1C and 1D) with respect to the frame 10 form a square shape when viewed from above, and thereby it is possible to arrange four of the display devices 1 (1C and 1D) that are mounted via the monitor fittings 2 to the brackets 11A, 11A, 11B, 11B so as to form a square shape when viewed from above.

In the multi-screen display device that is shown in the present exemplary embodiment as described in detail above, in at least a plurality of display devices 1 that are arranged mutually adjacently, by supporting the monitor fittings 2 of each display device 1 with either of the pair of the pin members 15 that are provided on the plate-like body 14 of the same bracket 11, for example it is possible to arrange the display devices 1 so as to form a square shape when viewed from above such as to bend 90 degrees as shown in FIG. 10, and so an unrestricted layout of a plurality of the display devices 1 becomes possible.

Note the present exemplary embodiment includes an example of arranging four display devices (1C and 1D) so as to form a square shape when viewed from above, but it is not limited thereto, and four or more display devices 1 may be laid out in any arrangement. For example, a free layout of a plurality of display devices 1 such as a parallelogram in plane view is possible. Also, by combining with the arrangement configuration shown in FIG. 5, the arrangement shown in FIG. 10 may be stacked multiple times in the vertical direction.

(Third Exemplary Embodiment)

Figure 11:
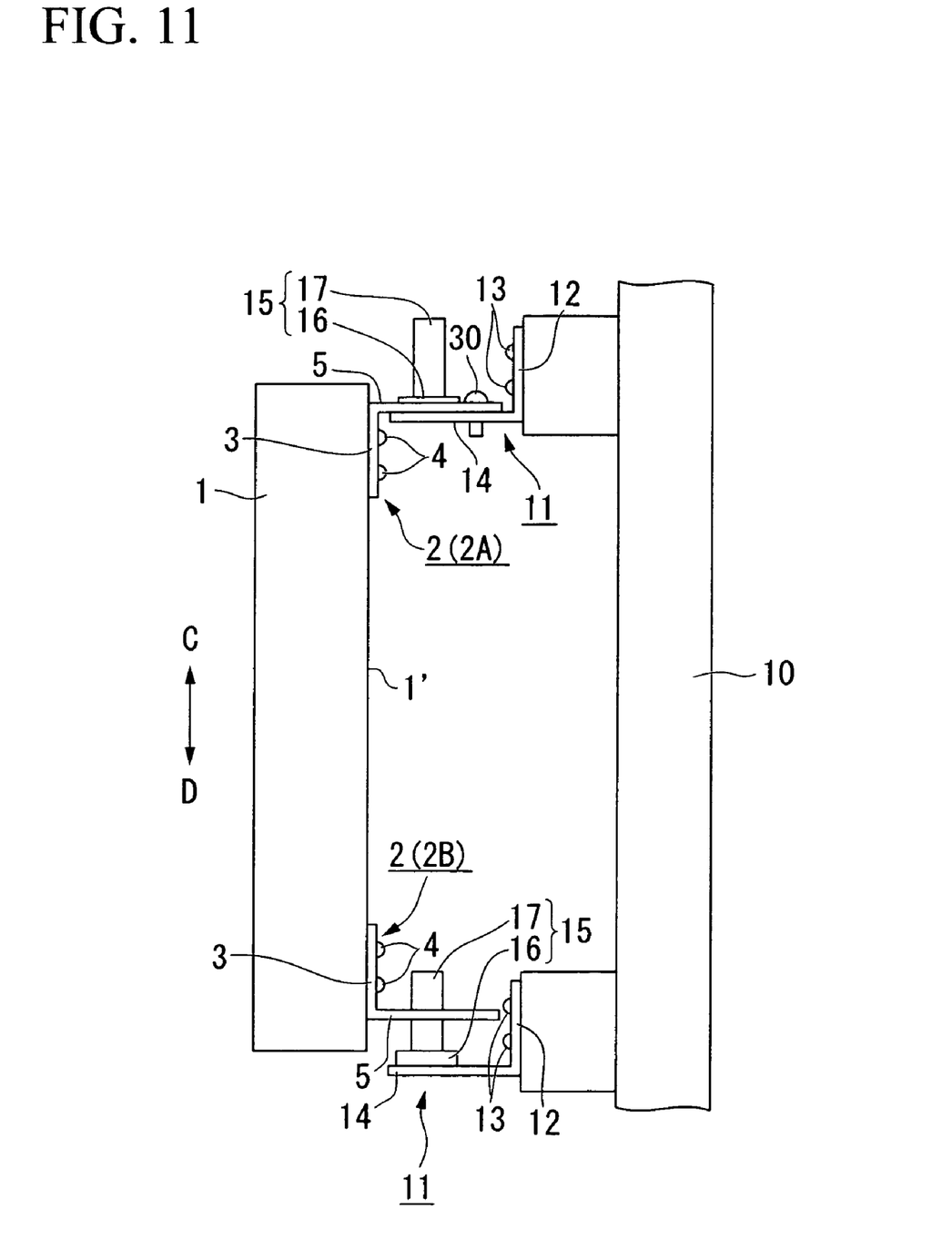
FIG. 11 is a side view that shows the state of screw fixing the display device to the frame, according to a third exemplary embodiment of the present invention.
Figure 12:
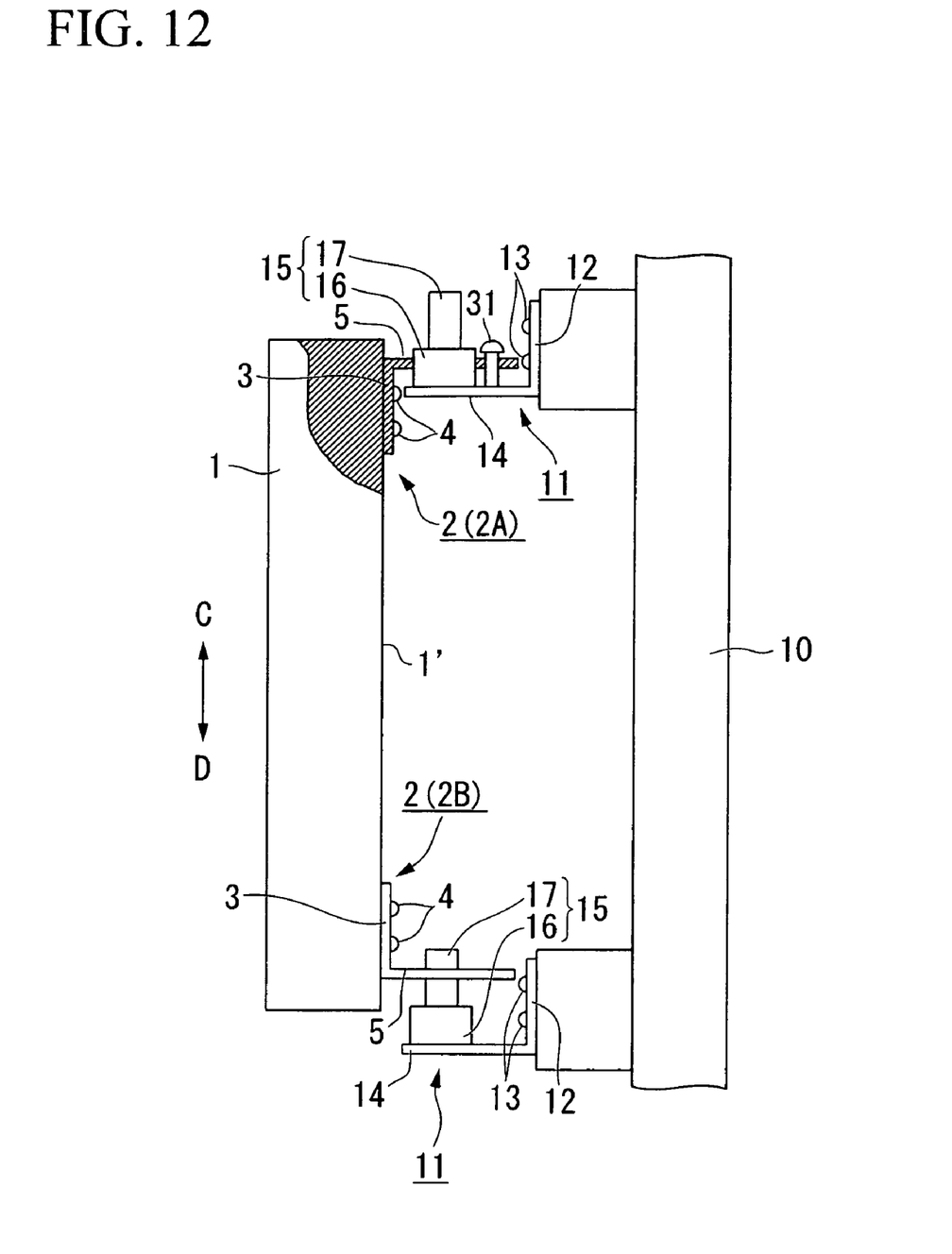
FIG. 12 is a side view that shows another embodiment of FIG. 11.

FIG. 11 and FIG. 12 are plan views of a multi-screen display device according to a third exemplary embodiment of the present invention. The multi-screen display device shown in the third exemplary embodiment differs from the forgoing exemplary embodiments on the point of providing screws 30 and 31 that couple the monitor fitting 2 and the bracket 11.

Specifically, as shown in FIG. 11, a screw 30 is provided in the plate-like body 5 of the monitor fitting 2 and the plate-like body 14 of the bracket 11 to mutually fasten these plate-like bodies 5 and 14 in the state of the pin member 15 of the bracket 11 being inserted in the long hole 6 that is formed in the plate-like body 5 of the monitor fitting 2. Then, by screwing in this screw 30 into the plate-like bodies 5 and 14, it is possible to fix and hold the display device 1 to the frame 10, and so it is possible to prevent any trouble of the display device 1 dropping out from the frame 10.

Also, it is not limited to fixing and holding the display device 1 to the frame 10 by the screw 30, and as shown in the partial sectional drawing of FIG. 12, the screw that is denoted by reference symbol 31 may be fastened to the plate-like body 5 of the monitor fitting 2 to press the plate-like body 14 of the bracket 11 by the lower end portion of the screw 31.

With such a constitution, by suitably adjusting the screw position of the screw 31 with respect to the plate-like body 5 of the monitor fitting 2, it is possible to adjust the vertical position of the display device 1, and thereby it becomes possible to accurately position and fix the display device 1 without producing gaps between the display devices 1 that are adjacently arranged one above the other.

The invention claimed is:

1. A fixing structure of a multi-screen display device that forms a large screen by adjacently arranging a plurality of display devices on a mounting seat by engaging a first support member provided on a back surface of a display device with a second support member that is provided on the mounting seat, wherein:

the first support member comprises a monitor fitting that includes a display-side support plate that is provided so as to project out from the back surface of the display device and a long hole that is formed in the display-side support plate along with a lateral direction of the display device, the monitor fitting being arranged at corner portions of the back surface of the display device;

the second support member comprises a fixing-side support plate that is perpendicularly provided on the mounting seat at a position corresponding to the first support member, and a pin member that is provided in a standing manner in a vertical direction on the fixing-side support plate and is inserted in the long hole of the first support member;

the monitor fitting of the first support member includes a pair of upper-side monitor fittings that are arranged at upper-side corner portions of the back surface of the display device, and a pair of lower-side monitor fittings that are arranged at lower-side corner portions of the back surface of the display device;

the pin member of the second support member includes a base end portion having a large diameter and provided on the fixing-side support plate, and a support pin having a small diameter and provided in a standing manner in the vertical direction on the base end portion;

a width dimension of a long hole of the upper-side monitor fitting is set so as to be engaged with the base end portion of the pin member, and a width dimension of a long hole of the lower-side monitor fitting is set so as to be engaged with the support pin of the pin member; and in a case of the first support member being engaged with the second support member, the long hole of the upper-side monitor fitting is engaged with the base end portion of the pin member, the display-side support plate of the upper-side monitor fitting is supported by the fixing-side support plate of the second support member, and the long hole of the lower-side monitor fitting is arranged at a midway portion along a length direction of the support pin of the pin member.

2. The fixing structure of a multi-screen display device according to claim 1, wherein:

the pin member of the second support member includes a pair of base end portions having a large diameter and provided spaced apart in the lateral direction on the fixing-side support plate, and support pins having a small diameter and provided in a standing manner in the vertical direction on each of the base end portions; and in the case of at least two display devices being adjacently arranged in the lateral direction, the pin member on one side of the second support member is inserted in the long hole of the first support member that is provided in the display device on one side, and the pin member on an other side of the second support member is inserted in the long hole of the first support member that is provided in the display device on an other side.

3. The fixing structure of a multi-screen display device according to claim 1, wherein a screw is provided in the display-side support plate of the first support member and the fixing-side support plate of the second support member, and mutually fastens the display-side support plate and the fixing-side support plate, in a state of the pin member being inserted in the long hole that is formed in the display-side support plate of the first support member.

4. The fixing structure of a multi-screen display device according to claim 1, wherein:

the first support member comprises an L-shape fitting; and a plate-like body on one side of the L-shape fitting includes a display-side support plate of an upper-side monitor fitting that has a large-diameter long hole whose width dimension is set so as to be engaged with the base end portion of the pin member, and a plate-like body on an other side of the L-shape fitting includes a display-side support plate of a lower-side monitor fitting that has a small-diameter long hole whose width dimension is set so as to be engaged with the support pin of the pin member.

5. A fixing method of a multi-screen display device that forms a large screen by adjacently arranging a plurality of display devices on a mounting seat, the method comprising:

arranging at corners of a back surface of a display device a monitor fitting that includes a display-side support plate that is provided so as to project out from the back surface of the display device and a long hole that is formed in the display-side support plate along with a lateral direction of the display device; and adjusting misalignment in the lateral direction of the display device by inserting a pin member that is provided on the mounting seat via a fixing-side support plate in a long hole of the monitor fitting provided on the back surface of the display device, and by adjusting a position of the pin member with respect to the long hole along a lengthwise direction of the long hole.

6. The fixing method of a multi-screen display device according to claim 5, comprising:

preparing, as the monitor fitting, a pair of upper-side monitor fittings that are arranged at upper-side corners of the back surface of the display device, and a pair of lower-side monitor fittings that are arranged at lower-side corners of the back surface of the display device; and supporting display-side support plates of the upper-side monitor fittings with fixing-side support plates that are fixed to the mounting seat, in a state of pin members that are provided on the mounting seat via fixing-side support plates being inserted in long holes of the upper-side and lower-side monitor fittings.

7. The fixing method of a multi-screen display device according to claim 6, comprising:

coupling the fixing-side support plate and the display-side support plate by screwing a screw into the fixing-side support plate that is fixed to the mounting seat and the display-side support plate of the upper-side monitor fitting that is supported by the fixing-side support plate.

8. The fixing method of a multi-screen display device according to claim 5, comprising:

arranging a pair of pin members adjacently in a lateral direction on the mounting bracket at a location where at least two display devices are adjacently arranged in the lateral direction; and inserting the pin member on one side in a long hole of a monitor fitting that is provided in the display device on one side, and inserting the pin member on an other side in a long hole of a monitor fitting that is provided in the display device on an other side.

9. The fixing method of a multi-screen display device according to claim 8, comprising:

forming a support member by adjacently arranging the pair of pin members that the holes of the monitor fittings are inserted in; and arranging a plurality of the support members in accordance with an installation interval of the long holes of the monitor fittings that are arranged along the lateral direction of the display device.

* * * * *